R. B. KASDORFF.
BICYCLE SUPPORT.
APPLICATION FILED OCT. 3, 1913.
1,107,427.
Patented Aug. 18, 1914.
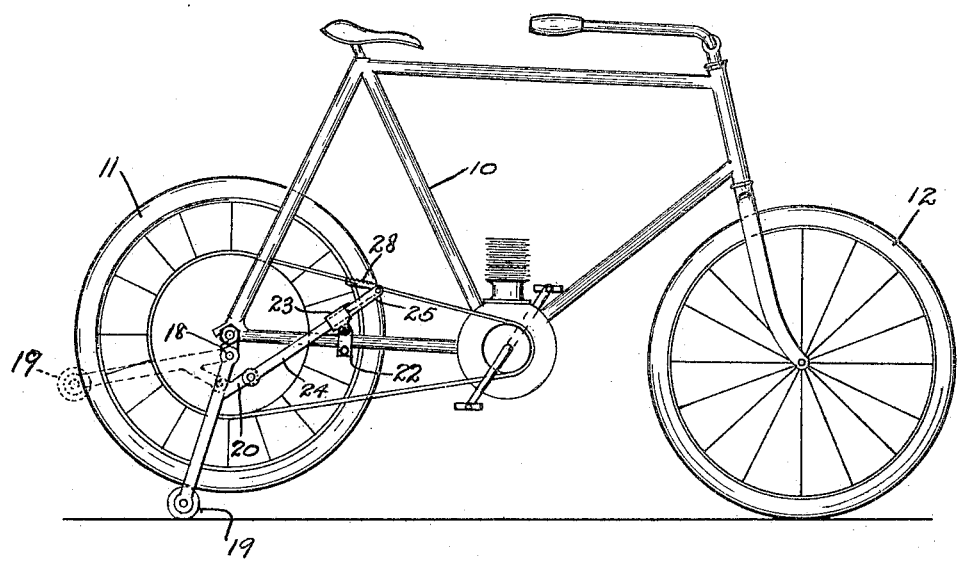
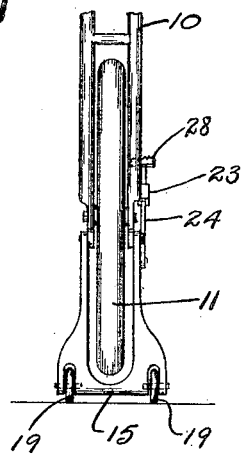
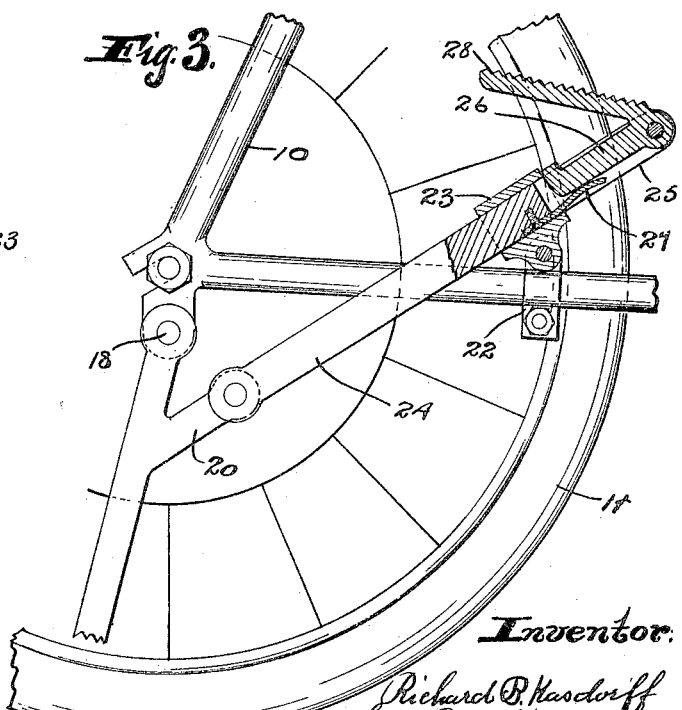

UNITED STATES PATENT OFFICE.

RICHARD B. KASDORFF, OF CLEVELAND, OHIO.

BICYCLE-SUPPORT.

1,107,427.  Specification of Letters Patent.  Patented Aug. 18, 1914.

Application filed October 3, 1913. Serial No. 793,170.

*To all whom it may concern:*

Be it known that I, RICHARD B. KAS-DORFF, a citizen of the United States of America, residing at Cleveland, in the county of Cuyahoga and State of Ohio, have invented certain new and useful Improvements in Bicycle-Supports; and I hereby declare the following to be a full, clear, and exact description of the invention, such as will enable others skilled in the art to which it pertains to make and use the same.

This invention relates to new and useful improvements in bicycle supports and particularly to a support for motorcycles.

The object of this invention is to provide a support of this character which will form a rest for the bicycle and which will also elevate the rear wheel thereof above the ground so that the machine can be readily cranked.

A further object of my invention is to provide a support of this character which can be operated from the seat of the machine so that it will not be necessary for the rider to dismount from the machine in order to lift the support after the machine has been cranked.

With these objects in view and with the intention of securing other advantages which will hereinafter appear, my invention consists in the features of construction and combination of parts, described in the specification, pointed out in the claims and illustrated in the accompanying drawings.

In the accompanying drawings Figure 1 is a view of a motorcycle equipped with my improved device, showing the device in full lines in its operative position and in dotted lines in its inoperative position. Fig. 2 is a rear view of a portion of the motorcycle with the device thereon. Fig. 3 is an enlarged detail view mostly in section.

Again referring to the drawings, 10 represents the frame of a motorcycle of the usual construction and 11 and 12 the wheels thereon. The support proper is U-shaped as shown at 15 and the side members thereof extend at each side of the rear wheel and are pivotally secured to the rear fork at 18. On the lower end of the support are mounted a pair of small wheels 19. On one of the side members of the support 15 is arranged a rigid arm 20. A bracket member 22 is secured to the lower cross bar of the frame of the machine and on this bracket 22 is pivotally mounted a small sleeve 23. A rod 24 is arranged to slide freely in the said sleeve 23 and the lower end of said rod 24 is pivotally secured to the rigid arm 20. The upper end of said rod 24 is forked or slotted, as shown at 25, and at the upper end of said rod in said slot is pivotally mounted a latch 26. A spring 27 is secured to the rod 24 and extends under the free end of the latch 26 and the arrangement is such that the spring 27 will hold the free end of said latch slightly above the upper surface of the said rod 24 so that the said latch 26 will engage with the front or back edge of the sleeve 23 according to the position of the rod, but when the said latch is depressed against the said spring 27 the said latch will pass freely through the sleeve. To the latch 26 is rigidly secured a toe piece 28, the upper surface of which is preferably corrugated.

The operation of the device is as follows: When the support is in the position shown in Fig. 1 the rear wheel will be raised from the ground and the machine will be in a position to be readily cranked. After the engine has been started it will not be necessary for the operator to dismount for by pressing his foot on the toe piece of the latch he will be able to depress the latch so that it can slip through the sleeve and the continued pressure of the foot on the toe piece will cause a downward and rearward movement of the rod 24, which, in turn, will cause the support to swing up at the rear of the wheel. When the pressure is removed from the toe piece the latch will be raised by the spring 27 and the latch will then engage the rear end of the sleeve and the support will be locked in its upper and inoperative position. If the rod should not be pushed back far enough to cause the latch to engage the rear end of the sleeve the support will simply drag at the rear of the wheel and the small wheels on said support will allow it to pass over the ground without being injured and the operator can press it up into position at his convenience.

What I claim is:

1. In a device of the character described, the combination with a bicycle of a U-shaped frame having the side members spaced a sufficient distance apart to receive a wheel therebetween, means for pivotally securing each side member to the frame of the bicycle, a rigid arm secured to one of the side members of the U-shaped frame, a sleeve supported on the frame of the bicycle, a rod slidably supported in said sleeve and having its lower end pivotally secured to said rigid arm, and a latch carried by said rod and adapted to engage with said sleeve, for the purpose set forth.

2. In a device of the character described, the combination with a bicycle of a U-shaped frame having the side members spaced a sufficient distance apart to receive a wheel therebetween, means for pivotally securing each side member to the frame of the bicycle, a rigid arm secured to one of the side members of the U-shaped frame, a sleeve pivotally supported from the frame of the bicycle, a rod slidably supported in said sleeve and having its lower end pivotally secured to said rigid arm, a latch carried by said rod and adapted to engage with the upper or lower end of said sleeve according to the position of said U-shaped frame and a toe-piece carried by said latch for the purpose set forth.

3. In a device of the character described, the combination with a bicycle of a U-shaped frame having the side members thereof spaced a sufficient distance apart to receive a wheel therebetween, means for pivotally securing each side member to the frame of the bicycle, a rigid arm secured to one of the side members of the U-shaped frame, a bracket secured to the frame of the bicycle, a sleeve pivotally supported on said bracket, a rod slidably supported in said sleeve and having its lower end pivotally secured to said rigid arm and having its upper end provided with a slot, a latch pivotally mounted at the end of said rod in said slot, a spring arranged beneath said latch for normally holding the free end of said latch above the surface of said rod and a toe-piece secured to said latch.

4. In a device of the character described, the combination with a bicycle of a U-shaped frame having the side members thereof spaced a sufficient distance apart to receive a wheel therebetween, means for pivotally securing each side member to the frame of the bicycle, wheels mounted on the lower end of said U-shaped frame, a rigid arm arranged on one of the side members of the U-shaped frame, a bracket secured to the frame of the bicycle, a sleeve pivotally supported on said bracket, a rod slidably supported in said sleeve and having its lower end pivotally secured to said rigid arm and having its upper end provided with a slot, a latch pivotally mounted at the end of said rod in said slot, a spring arranged beneath said latch for normally holding the free end of said latch above the surface of said rod and a toe-piece secured to said latch.

In testimony whereof, I sign the foregoing specification, in the presence of two witnesses.

RICHARD B. KASDORFF.

Witnesses:
VICTOR C. LYNCH,
N. L. McDONNELL.

---

Copies of this patent may be obtained for five cents each, by addressing the "Commissioner of Patents, Washington, D. C."